(12) United States Patent
Banerjee et al.

(10) Patent No.: US 10,187,294 B2
(45) Date of Patent: *Jan. 22, 2019

(54) FAST LOOKUP AND UPDATE OF CURRENT HOP LIMIT

(71) Applicant: VMware, Inc., Palo Alto, CA (US)

(72) Inventors: Amitabha Banerjee, San Jose, CA (US); Lenin Singaravelu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,670

(22) Filed: May 29, 2017

(65) Prior Publication Data

US 2017/0331723 A1 Nov. 16, 2017

Related U.S. Application Data

(63) Continuation of application No. 14/231,677, filed on Mar. 31, 2014, now Pat. No. 9,667,528.

(51) Int. Cl.

| | |
|---|---|
| *H04L 12/733* | (2013.01) |
| *H04L 12/751* | (2013.01) |
| *H04L 12/753* | (2013.01) |
| *H04L 29/06* | (2006.01) |
| *H04L 12/721* | (2013.01) |

(52) U.S. Cl.
CPC .............. *H04L 45/20* (2013.01); *H04L 45/02* (2013.01); *H04L 45/48* (2013.01); *H04L 45/566* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 4,468,728 | A | * | 8/1984 | Wang ................ G06F 17/30327 |
| 5,265,092 | A | | 11/1993 | Soloway |
| 6,009,372 | A | | 12/1999 | Baker |
| 6,484,149 | B1 | | 11/2002 | Jammes |
| 6,498,795 | B1 | | 12/2002 | Zhang |
| 6,587,795 | B2 | | 7/2003 | Bhattacharya |
| 6,691,168 | B1 | | 2/2004 | Bai |
| 6,859,435 | B1 | * | 2/2005 | Lee .......................... H04L 47/10 |
| | | | | 370/231 |

(Continued)

OTHER PUBLICATIONS

Touch et al., "Transparent Interconnection of Lots of Links (TRILL): Problem and Applicability Statement", May 2009, pp. 1-17, IETF Trust, RFC 5556.

*Primary Examiner* — Bunjob Jaroenchonwanit

(57) ABSTRACT

In order to facilitate efficient and scalable lookup of current hop limits of transmitted packets, a communications device embeds hop limit values along with other connection parameters in a connection data structure. To transmit a packet for a particular connection, the communications device retrieves the data structure for the particular connection and applies the hop limit value embedded in the data structure to the packet for transmission. To keep track of the hop limits being embedded in different data structures of different connections, the communications device use a binary search in which each node of the search tree correspond to a different connection. The communications device maintains one such search tree per communications interface.

20 Claims, 11 Drawing Sheets

(56) References Cited

U.S. PATENT DOCUMENTS

| | | | |
|---|---|---|---|
| 6,978,271 B1* | 12/2005 | Hoffman | G06F 17/30091 |
| 7,079,544 B2 | 7/2006 | Wakayama | |
| 7,209,977 B2 | 4/2007 | Archarya | |
| 7,280,481 B2* | 10/2007 | Rong | H04L 45/12 |
| | | | 370/238 |
| 7,406,540 B2 | 7/2008 | Archarya | |
| 7,539,694 B1 | 5/2009 | Althoff | |
| 8,767,757 B1 | 7/2014 | Chudgar | |
| 9,667,528 B2* | 5/2017 | Banerjee | H04L 45/20 |
| 2002/0038360 A1 | 3/2002 | Andrews | |
| 2002/0080786 A1 | 6/2002 | Roberts | |
| 2002/0184221 A1* | 12/2002 | Ahmad | H04L 45/745 |
| 2003/0018688 A1* | 1/2003 | Sternin | G06F 17/3033 |
| | | | 718/103 |
| 2003/0065711 A1 | 4/2003 | Archarya | |
| 2003/0167213 A1* | 9/2003 | Jammes | G06F 17/3089 |
| | | | 705/26.62 |
| 2004/0039844 A1* | 2/2004 | Bonn | H04L 41/12 |
| | | | 709/245 |
| 2004/0052251 A1* | 3/2004 | Mehrotra | H04L 45/00 |
| | | | 370/389 |
| 2004/0062224 A1* | 4/2004 | Brownrigg | H04L 29/06 |
| | | | 370/338 |
| 2004/0156388 A1* | 8/2004 | Bush | H04W 36/30 |
| | | | 370/465 |
| 2004/0267897 A1 | 12/2004 | Hill | |
| 2005/0050018 A1 | 3/2005 | Basso | |
| 2005/0053079 A1 | 3/2005 | Havala | |
| 2005/0132004 A1 | 6/2005 | Guingo | |
| 2005/0149513 A1* | 7/2005 | Karlsson | G06F 17/30961 |
| 2005/0175005 A1* | 8/2005 | Brown | H04L 45/00 |
| | | | 370/389 |
| 2005/0201377 A1 | 9/2005 | Chao | |
| 2005/0243722 A1 | 11/2005 | Liu | |
| 2006/0007942 A1 | 1/2006 | Ogawa | |
| 2006/0028999 A1 | 2/2006 | Iakobashvilli | |
| 2006/0029056 A1 | 2/2006 | Perera | |
| 2006/0037075 A1 | 2/2006 | Frattura | |
| 2006/0159034 A1* | 7/2006 | Talur | H04L 45/00 |
| | | | 370/254 |
| 2006/0206655 A1 | 9/2006 | Chappell | |
| 2006/0248287 A1* | 11/2006 | Buyuktosunoglu | G06F 12/0833 |
| | | | 711/146 |
| 2007/0038775 A1 | 2/2007 | Parekh | |
| 2007/0055789 A1 | 3/2007 | Claise | |
| 2007/0088854 A1 | 4/2007 | Park | |
| 2007/0112795 A1* | 5/2007 | Travison, Jr. | G06F 17/30327 |
| 2008/0002640 A1* | 1/2008 | Westphal | H04W 40/02 |
| | | | 370/338 |
| 2008/0151893 A1 | 6/2008 | Nordmark | |
| 2008/0181245 A1 | 7/2008 | Basso | |
| 2009/0028069 A1* | 1/2009 | Lin | H04L 29/12254 |
| | | | 370/256 |
| 2009/0133082 A1 | 5/2009 | Yamanoue | |
| 2009/0182952 A1* | 7/2009 | Moyer | G06F 12/122 |
| | | | 711/136 |
| 2010/0165989 A1 | 7/2010 | Jain | |
| 2011/0113129 A1* | 5/2011 | Sundstrom | H04L 45/00 |
| | | | 709/223 |
| 2012/0023082 A1* | 1/2012 | Kotha | G06F 17/30625 |
| | | | 707/706 |
| 2012/0119927 A1* | 5/2012 | Zhang | H03M 7/3066 |
| | | | 341/79 |
| 2012/0236792 A1* | 9/2012 | Brownrigg | H04L 29/06 |
| | | | 370/328 |
| 2014/0089454 A1* | 3/2014 | Jeon | H04L 67/2852 |
| | | | 709/213 |
| 2014/0115293 A1* | 4/2014 | Taylor | G06F 12/023 |
| | | | 711/170 |
| 2014/0126418 A1* | 5/2014 | Brendel | H04L 12/4641 |
| | | | 370/254 |
| 2014/0241345 A1* | 8/2014 | DeCusatis | H04L 49/25 |
| | | | 370/355 |
| 2014/0328207 A1* | 11/2014 | Agrawal | H04L 41/12 |
| | | | 370/254 |
| 2015/0091909 A1* | 4/2015 | Ajwani | G06T 11/206 |
| | | | 345/440 |
| 2015/0092778 A1 | 4/2015 | Jackson | |
| 2015/0209662 A1 | 7/2015 | Vukojevic | |
| 2016/0044143 A1 | 2/2016 | Narasimhamurthy | |

\* cited by examiner

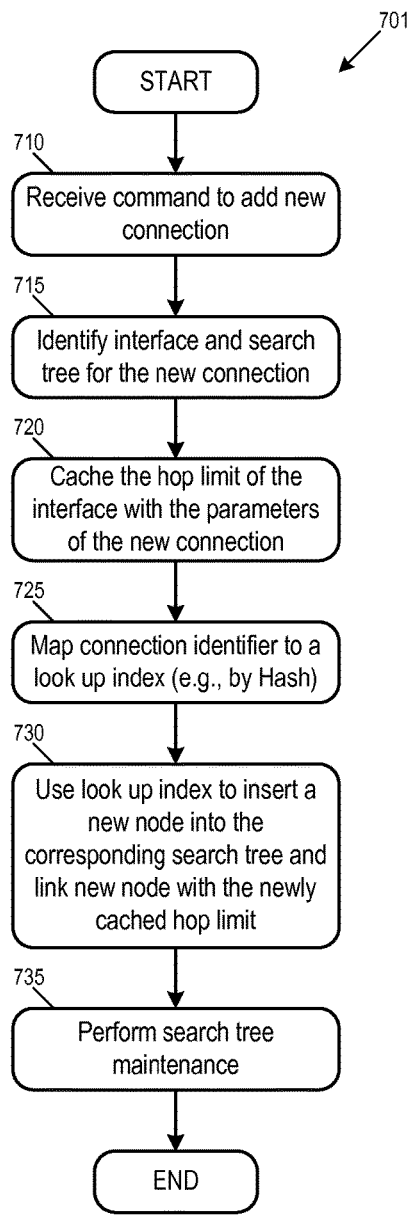
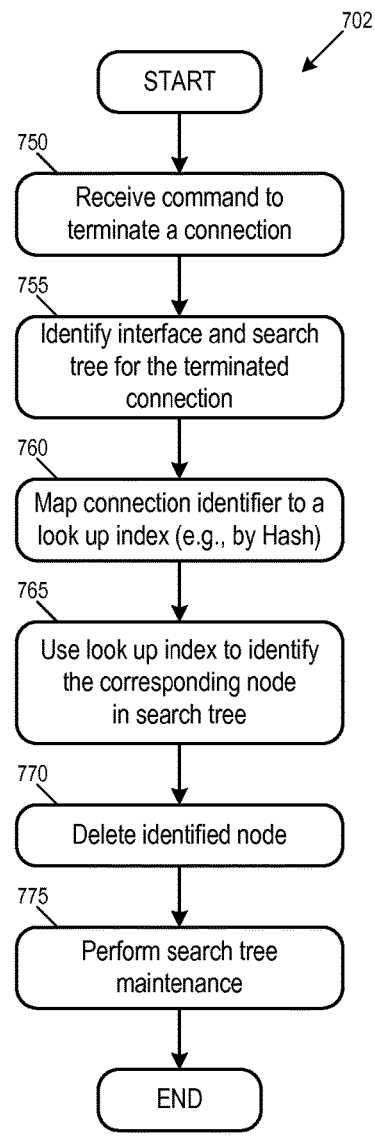
*Figure 7a*   *Figure 7b*

FAST LOOKUP AND UPDATE OF CURRENT HOP LIMIT

CROSS REFERENCE TO RELATED APPLICATION

This application is a continuation of U.S. patent application Ser. No. 14/231,677, entitled "Fast Lookup and Update of Current Hop Limit", filed Aug. 31, 2014, the entirety of which is incorporated herein by reference.

BACKGROUND

Each router reduces this hop limit by one, and the packet is finally discarded when the hop limit becomes 0. It is the responsibility of the host transmitting an IPv6 packet to set a hop limit for every IPv6 packet is transmitted.

The hop limit can be set in two ways: (i) by a system administrator for the host, or (ii) from the current hop limit of the interface via which this packet is to be transmitted. The current hop limit of the interface is maintained and updated from information in "Router Advertisement" messages. A "Router Advertisement" message is generated in response to a "Router Solicitation" message from the host, or when there if is an update in the network topology. The latter case is very common when an IPv6 address is configured in "Auto-configuration" or "DHCPv6" modes. However, if a router goes down, a flood of "Router Advertisement" messages can be generated in the network, causing frequent update of the current hop limit of an interface. It is therefore very important to set the 8-bit hop limit value for each and every packet in a fast and efficient way that can sustain a packet rate of millions of packets a second, and can scale to thousands of Transmission Control Protocol (TCP) connections that a host may need to handle.

A previous approach to the problem is to look up the "current hop limit" from the interface in the routing table. However, this doesn't scale for performance, because an expensive routing table lookup is required for transmission of each and every packet. Another approach is to have a cache for the routing table of every TCP flow on a per CPU basis (also known as flow table in literature). A routing table lookup can be performed against the flow table. The flow table can be invalidated periodically to avoid being stale. Though this approach is suitable for finding a route, it is not reliable for looking up "current hop count". This is because if a stale current hop count value is set from the cache, it may lead to a packet getting dropped by a router.

SUMMARY

In order to facilitate efficient and scalable lookup of current hop limits of transmitted packets, some embodiments embed hop limit values along with other connection parameters in a connection data structure. To transmit a packet for a particular connection, a communications device retrieves the data structure for the particular connection and applies the hop limit value embedded in the data structure to the packet for transmission. To keep track of the hop limits being embedded in different data structures of different connections, some embodiments use a binary search in which each node of the search tree correspond to a different connection. Some embodiments maintain one such search tree per communications interface.

In order to keep track of the copies of the hop limit value that are cached in the different connection data structures, some embodiments use a binary search in which each node of the search tree correspond to a different connection. In some embodiments, each communications interface has its own corresponding search tree for keeping track of the cached copies of the interface's own hop limit value. The use of the search tree allows any cached copy of the hop limit value to be located in a number of traversal steps that is in the order of log(n), n being the number of nodes in the search tree (i.e., the number of connections established on the interface). In some embodiments, the search tree is a binary search tree such as an Adelson-Velskii and Landis (AVL) search tree.

In some embodiments, the search trees for locating cached hop limit values are dynamically maintained and updated. When a new connection is established across a particular interface, some embodiments add a node for the newly established connection to the search tree of the particular interface. When a connection terminates, some embodiments removes a corresponding node from the search tree. When a search tree becomes unbalanced, some embodiments optimize the search tree in order to ensure that all nodes can be reached from a top node in the order of log (n) traversal steps.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 7a conceptually illustrates a process for adding a node to a hop limit search tree.

FIG. 7b conceptually illustrates a process for removing a connection from a hop limit search tree.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In order to facilitate efficient and scalable lookup of current hop limits of transmitted packets, some embodiments embed hop limit values along with other connection parameters in a connection data structure. To transmit a packet for a particular connection, a communications device retrieves the data structure for the particular connection and applies the hop limit value embedded in the data structure to the packet for transmission. To keep track of the hop limits being embedded in different data structures of different connections, some embodiments use a binary search in which each node of the search tree correspond to a different connection. Some embodiments maintain one such search tree per communications interface.

Several more detailed embodiments of the invention are described below. Section I further describes hop limit values that are embedded in data structures of connection parameters. Section II describes using search tree for managing the embedded hop limit values. Section III describes an example communications device that implements some embodiments of the invention. Finally, section IV describes an electronic system with which some embodiments of the invention are implemented.

I. Cached Hop Limits in Connection Parameters

As mentioned, current hop limit or hop limit value is a required field in the IP header of a packet in a TCP connection. However, a current hop limit is a value that is specified for each communications interface, not for each connection. Rather than having to look up the current hop limit value of the communications interface for each packet being transmitted, some embodiments embed the current hop limit value of a communications interface to the data structure of every connection established on that communications interface. Such interface specific values that are embedded with other connection parameters in data structures of the connections can be considered as being cached.

Figure 1:
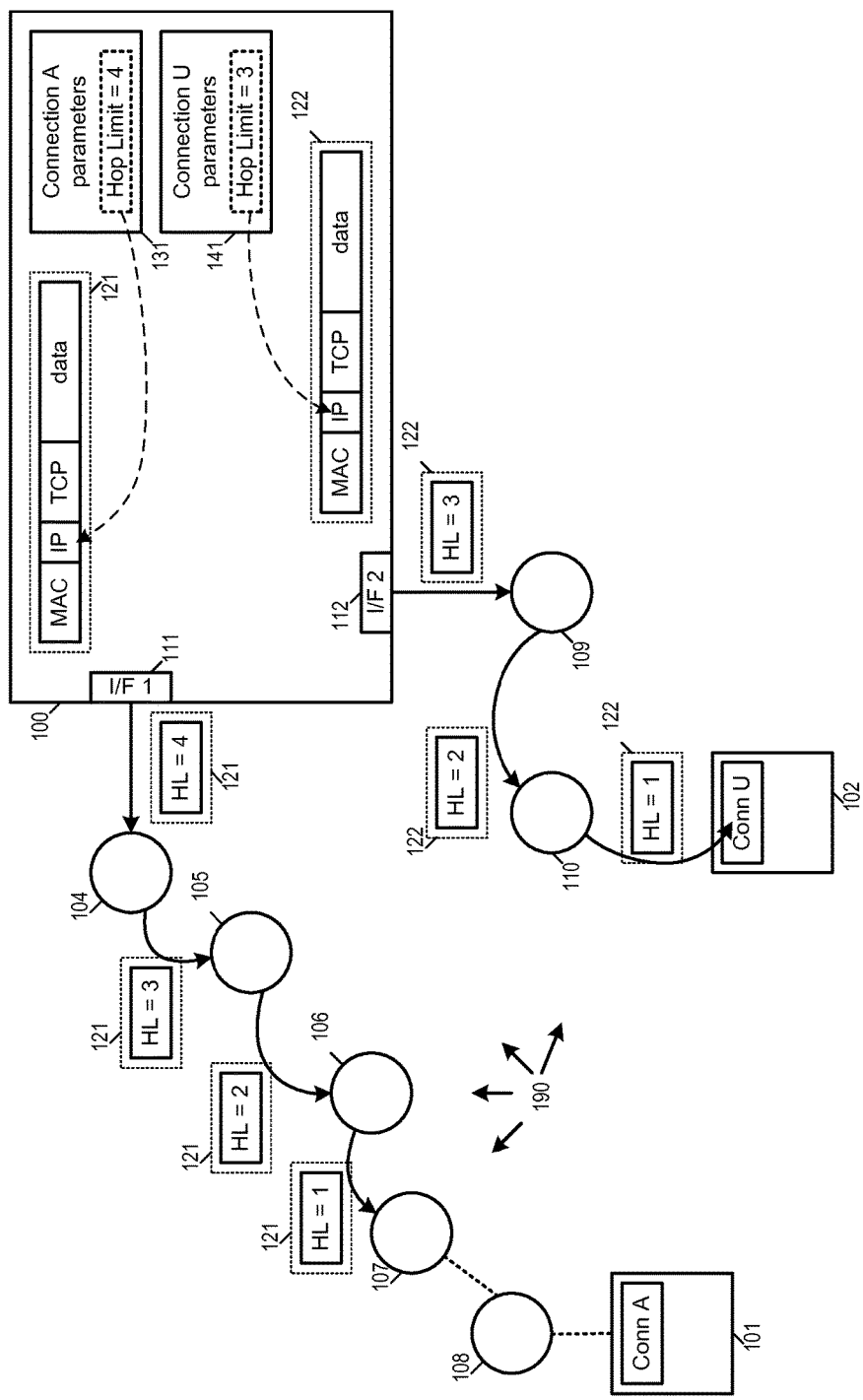
FIG. 1 illustrates a communications device that uses hop limit values cached in data structures of connections when transmitting packets.

FIG. 1 illustrates a communications device 100 that uses hop limit values cached in data structures of connections when transmitting packets. The communications device 100 is communicatively linked with other communications devices over one or more communication mediums 190 that include several communication nodes 101-110. The communications device 100 has established a connection A with the communications node 101 and a connection U with a communications node 102. The device 100 is sending a packet 121 to the communications node 101 for connection A through a communications interface 111 and a packet 122 to the communications node 102 for connection U through a communications interface 112.

In some embodiments, the communications device 100 is a mobile device that is wirelessly connected to the communications medium 190. In some embodiments, the communications device 100 is a network node that has a NIC to allow it to connect to the communications medium. In some embodiments, the communications device 100 is a host machine in a virtualized network environment. In some of these embodiments, the communications medium 190 is supporting one or more logical networks, while the communications device 100 is hosting one or more virtual machines that operate in those logical networks.

As illustrated, the communications device 100 stores data structures associated with different TCP connections, including a data structure 131 for connection A and a data structure 141 for connection U. The data structures 131 and 141 specify parameters for connections A and U, respectively. In some embodiments, these are data that are necessary for maintaining stateful connections with remote communications devices as well as for specifying headers of packets. In some embodiments, when transmitting a packet of a particular connection, the communications device retrieves the connection data structure for that particular connection, so any values or parameters that are included as part of the connection data structure will always be available in the context of the packet to be transmitted.

The communications mediums 190 include one or more types of physical communications mediums and support one or more networks. Such physical mediums can include wired mediums such as Ethernet or wireless mediums such as WiFi or Bluetooth. In some embodiments, each communications node linked by the communications mediums 190 includes one or more communications interfaces to the communications mediums. As illustrated, the communications device 100 includes communications interfaces 111 (I/F 1) and 112 (I/F 2) for interfacing with the communications mediums 190. In some embodiments, each communications interface includes a PHY (L1 physical layer interfaces) for sending and receiving signals from the communications mediums by using a particular communications standard or technology, such as Gigabit Ethernet, 10 Gigabit Ethernet, or WiFi.

In some embodiments, some communications nodes are network nodes in data center that are interlinked by infrastructures or backbones provided by the data center. In some embodiments, some of the communications nodes are network switches, routers, gateways, hubs, or repeaters. In some embodiments, the topology of the supported networks can change dynamically, as some of the communications nodes are mobile devices. Some of the communications node can be dynamically reconfigured to change the topology of the supported networks. According to the topology of the communications mediums 190 as illustrated in FIG. 1, the packet 121 has to hop through communications nodes 104-108 to reach the device 101 (i.e., six hops), while the packet 122 has to hop through communications nodes 109-110 to reach the device 101 (i.e., three hops).

The number of hops that each packet is allowed to have is limited by the hop limit value specified in each packet. In this example, the hop limit for the packet 121 is 4, and the hop limit for packet 122 is 3. The communications nodes along the hop path of a packet decrement the hop limit value in the packet's header until the packet has reached destination or until the hop limit value has reached zero and the packet discarded. As illustrated, the packet 121 is unable to reach its destination node 101 within its specified hop limit of 4 (because the hop limit value reached zero at the communications node 107), while the packet 122 is able to reach its node 102 within its specified hop limit of 3 (before the hop limit value reached zero).

In some embodiments, the hop limit of a packet is specified in the header of the packet. In this example, the packets 121 and 122 have MAC (media access control), IP (internet protocol), and TCP headers, and the IP header of each packet specifies the hop limit of the packet. The device 100 inserts the hop limit values of the packets 121 and 122 into each header's IP header. As illustrated, hop limit values for the device 100 are embedded in the connection data structures such as 131 and 141. Consequently, the hop limit value of a connection becomes available for insertion into IP header as soon as the communications device retrieves the connection data structure for that connection.

Figure 2:
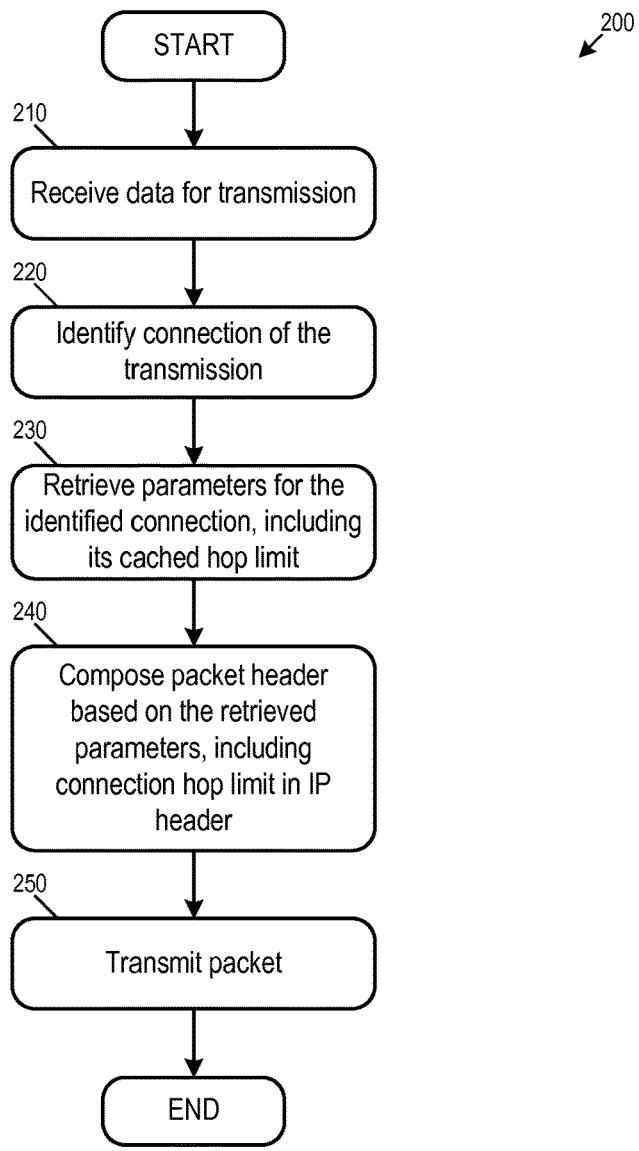
FIG. 2 conceptually illustrates a process for inserting hop limit values into transmitted packets.

FIG. 2 conceptually illustrates a process 200 for inserting hop limit values into transmitted packets. In some embodiments, the process 200 is performed at a communications interface of a communications device. In the example of FIG. 1, the process 200 is performed at the interface 111 when transmitting the packet 121 for connection A and also at the interface 112 when transmitting the packet 122 for connection U.

The process starts when it receives (at 210) data for transmission on a particular connection. The process then identifies (at 220) the particular connection that the data is for and retrieves (at 230) the parameters for the identified connection. In some embodiments, this entails retrieving the data structure storing the parameters for the particular connection. As mentioned, such a data structure includes a hop limit value.

Next, the process composes (240) or assembles the packet header based on the retrieved connection parameters. Since the hop limit value is among the retrieved connection parameters, the process is able to insert the hop limit value into the packet. The process 200 then transmits (at 250) the composed packet and ends.

As mentioned, in some embodiments, packet hop limit values are specified for each communications interface. The packet hop limit of an interface is applicable to all packets transmitted through the interface, and consequently applicable to all connections that are established through the interface. However, since the hop limit value of the interface is already embedded within the connection data structures of all of those connections (i.e., each connection data structure has a cached copy of the hop limit), the transmitting communications device need not perform an additional look up for the interface's hop limit value. This is a saving in computation time that is realized over every packet transmitted on that interface. Consequently, the transmitting communications device is able to greatly improve its performance when having to transmit millions of packets each second.

II. Using Search Tree for Managing Cached Hop Limits

In some embodiments, many different TCP connections can be established on a same communications interface simultaneously, and each of these TCP connections has its own corresponding data structure for holding connection parameters. Since each of these connection data structures has a cached copy of the hop limit, it is important to make sure that those cached copies of the hop limit value are up to date. This is especially important for communications devices in networks that frequently change topology and thus requiring frequent update of current hop limit values.

In order to keep track of the copies of the hop limit value that are cached in the different connection data structures, some embodiments use a binary search in which each node of the search tree correspond to a different connection. In some embodiments, each communications interface has its own corresponding search tree for keeping track of the cached copies of the interface's own hop limit value. The use of the search tree allows any cached copy of the hop limit value to be located in a number of traversal steps that is in the order of log(n), n being the number of nodes in the search tree (i.e., the number of connections established on the interface). In some embodiments, the search tree is a binary search tree such as an Adelson-Velskii and Landis (AVL) search tree.

Figure 3:
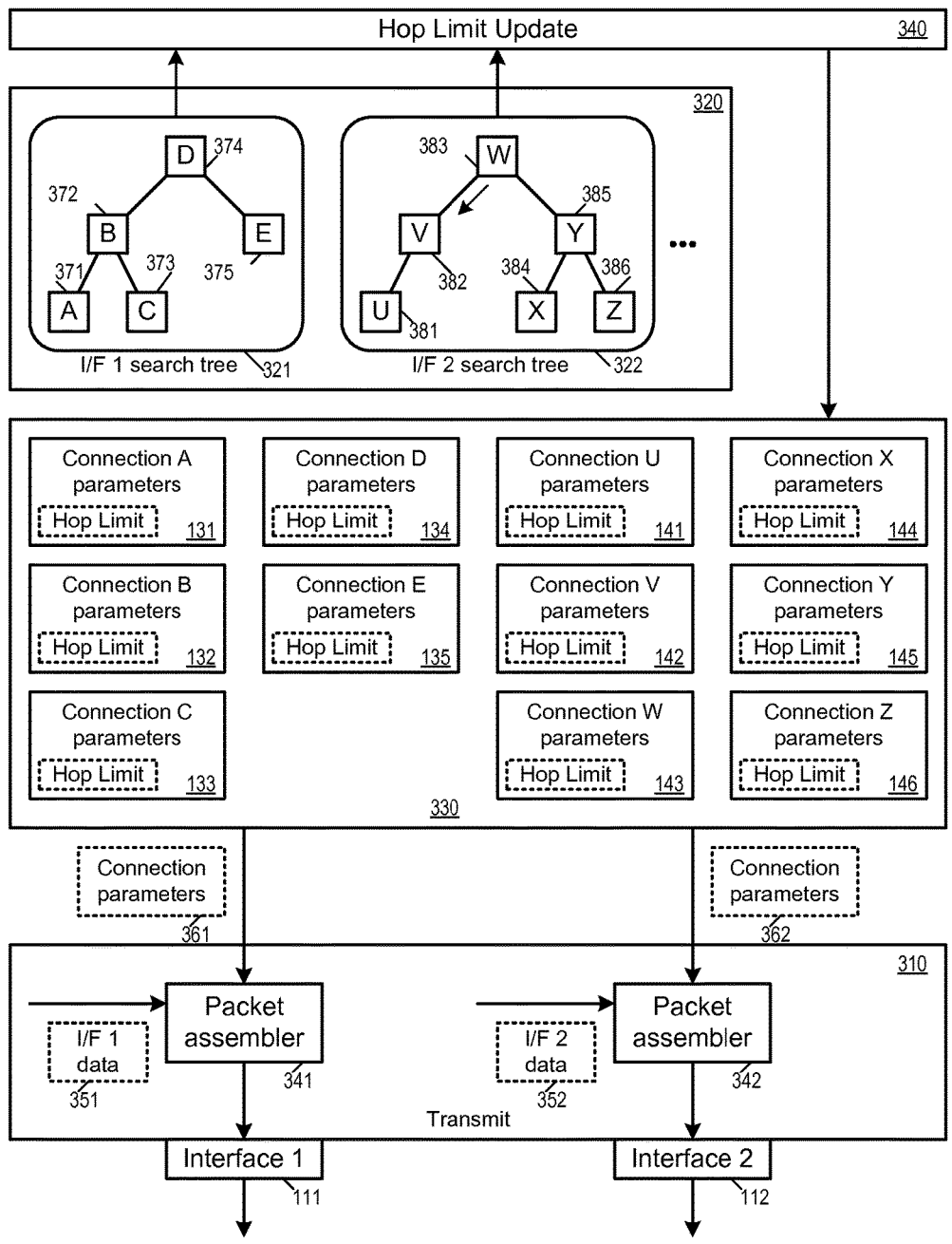
FIG. 3 illustrates the use of search trees for managing cached copies of hop limit values by a communications device.

FIG. 3 illustrates the use of search trees for managing cached copies of hop limit values by the communications device 100. As illustrated the device 100 has two communications interfaces 111 (interface 1) and 112 (interface 2). The connections A, B, C, D, and E use the interface 111 and the connections U, V, W, X, Y, and Z use the interface 112. The hop limit value of the interface 1 is cached in connection data structures 131-135. The hop limit value of the interface 2 is cached in connection data structures 141-146. The device 100 includes a transmit module 310, a search tree management module 320, a storage module 330, and a hop limit update module 340.

The transmit module 310 is responsible for assembling packets and then deliver the assembled packets to be transmitted by one of the interfaces (or PHYs) 111 and 112. The transmit module 310 assembles headers and payloads of packets. In some embodiments, packets are assembled according to requirements of network stack as the transmit module 310 handles the protocols for different layers of network communications. FIG. 3 illustrates two packet assemblers 341 and 342 for representing the packet assembling operations for the interfaces 111 and 112. In some embodiments, different interfaces share computing resources for assembling packets, and would therefore have only one packet assembler.

In order to assemble packet to be transmitted over an interface for a particular connection, the packet assembler of the interface retrieves a corresponding connection data structure from the storage module 330. For example, to assemble the header for a packet for connection C through the interface 111, the packet assembler 341 retrieves the data structure 133 from the storage 330, and the hop limit cached within the data structure 133 then is inserted into the packet header. Likewise, to assemble the header for a packet for connection V through the interface 112, the packet assembler 342 retrieves the data structure 142 from the storage 330, and the hop limit cached within the data structure 142 then is inserted into the packet header. The retrieval of cached hop limit values for insertion into transmitted data packet is described by reference to the process 200 in FIG. 2 above.

The search tree management module 320 manages search trees 321 and 322. The search tree 321 is managing the copies of the hop limit value of the interface 111 that are cached within the data structures 131-135. The search tree 322 is managing the copies of the hop limit value of the interface 112 that are cached within the data structures 141-146. As mentioned, connections A, B, C, D, and E are established over the interface 111. Correspondingly, the search tree 321 has nodes 371-375 that correspond to the connections A, B, C, D, and E. Likewise, connections U, V, W, X, Y, and Z are established over the interface 112. Correspondingly, the search tree 322 has nodes 381-386 that correspond to the connections U, V, W, X, Y, and Z. In some embodiments, each node in the search tree stores a pointer that points to a storage location in a corresponding connection data structure. The content of a search tree node will be further described below by reference to FIG. 4.

The search trees 321 and 322 are AVL binary search trees. The search tree management module 320 performs AVL tree operations such as tree traversal, node insertion, node deletion, and tree rotation/optimization. The principles of AVL binary search trees are well known in the art. In the example of FIG. 3, each node in the search trees 321 and 322 has at most two child nodes. The right child node is a "greater" node (i.e., having a value that is greater than that of the parent node) while the left node is a "lesser" node (i.e., having a value less than that of the parent node). To locate the cached copy of the hop limit for the connection C, for example, the search tree management module 320 traverses the search tree 321 until it arrives at the node 373. Likewise, to locate the cached copy of the hop limit for the connection V, the search tree management module 320 traverses the search tree 322 until it arrives at the node 382. The structure of a search tree ensures that the time required for locating any node in the tree is in the order of log(n), n being the number of nodes in the search tree.

The hop limit update module 340 is responsible for propagating any changes in hop limit for an interface to all cached copies of the hop limit. As illustrated, the hop limit update module 340 uses the search trees 321 and 322 to locate and update the cached copies of the hop limits in the data structures 131-135 and 141-146. The updating of cached hop limit values will be described further by reference to FIGS. 6 and 8 below.

Figure 4:
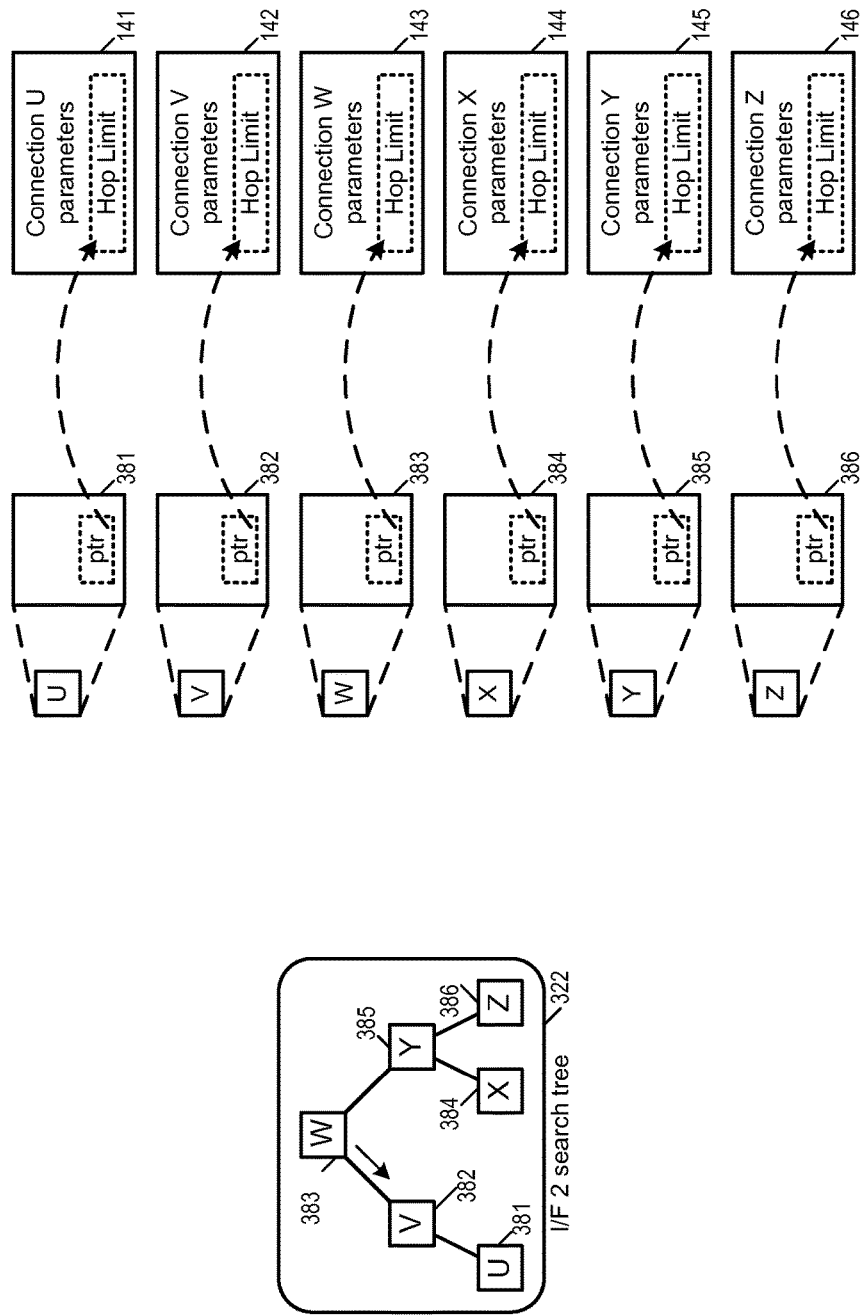
FIG. 4 illustrates the relationship between the content of a node in the search tree and the cached copies of the hop limit value.

Once the hop limit update module 340 has located a node in the search tree, it is able to access the cached hop limit value pointed to by the content of the node. FIG. 4 illustrates the relationship between the content of a node in the search tree and the cached copies of the hop limit value. FIG. 4 illustrates the contents of the node 381-386 of the search tree 322 for the interface 112. As illustrated, each of nodes 381-386 is storing a pointer that points at a copy of the hop limit value of the interface 112. Since these copies of the hop limit values are cached or embedded within the connection data structures 141-146 for the connections U through Z, the pointers stored in the nodes 381-386 are also pointing at locations within those data structures. For example, the pointer stored in the node 381 is pointing at a location within the data structure 141 that stores a copy of the hop limit value of the interface 112.

As mentioned, each node of a search tree corresponds to a connection (e.g., TCP) established over the communications interface associated with the search tree. In order to map a connection to a node in a search tree, some embodiments convert the identifying information of a connection into an index, and the index is in turn used to locate a node in the search tree for the connection. In some embodiments, the five-tuple (source address, source port, destination address, destination port, protocol type) of a TCP connection is used as the identifier of the TCP connection. Some embodiments apply a hashing function to the connection's identifier in order to produce the search tree node index (or look up index) for the connection.

Figure 5:
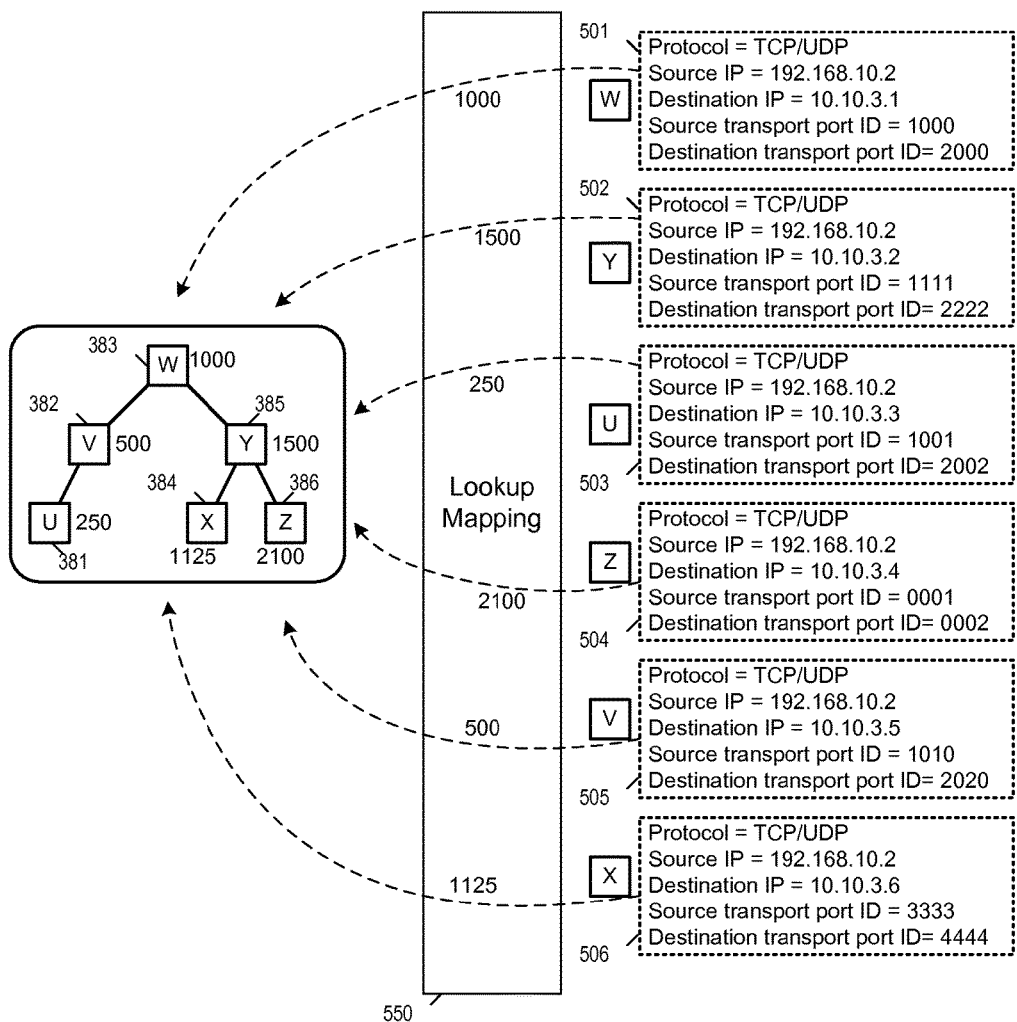
FIG. 5 conceptually illustrates the mapping of connection identifiers to nodes in a hop limit search tree.

FIG. 5 conceptually illustrates the mapping of connection identifiers to nodes in the hop limit search tree 322. The figure illustrates five tuple identifiers 501-506 that correspond to connections U, V, W, X, Y, and Z. Each of these sets of five tuple identifiers is mapped to a search tree node index by a connection identifier mapping module 550. In some embodiments, the mapping of connection identifiers to search tree node indices is performed by the update hop limit update module 340. The hop limit update module 340 maps the connection identifier to a search tree node index, and search tree management module 320 uses the search tree node index to traverse the search tree 322 and find the corresponding node.

As mentioned above, in some embodiments, the search trees 321 and 322 are AVL binary search trees, and that each node has at most two child nodes and each node is associated with an index value. The right child node is a node that has an index value that is greater than that of the parent node, while the left child node is a node that has an index value that is less than that of the parent node.

In the example of FIG. 5, the connection identifier mapping module 550 maps the 5-tuple identifier of the connection W to index 1000, connection Y to index 1500, connection U to index 250, connection Z to index 2100, connection V to index 500, connection X to index 1125. The indices are in turn used to locate a node in the binary search tree 322 in at most log (n) traversal steps (e.g., log 2 (n), since this is a binary search tree). For example, to locate a node with index 250 (i.e., the connection U), the search tree management module 320 traverses the search tree 322 by starting from the top node 383 to its left child node 382 (because 250 is less than 1000), then traverses from the node 382 to its left child node 381 (because 250 is less than 500), which is associated with the index 250.

In some embodiments, the search trees for locating cached hop limit values are dynamically maintained and updated. When a new connection is established across a particular interface, some embodiments add a node for the newly established connection to the search tree of the particular interface. When a connection terminates, some embodiments removes a corresponding node from the search tree. When a search tree becomes unbalanced, some embodiments optimize the search tree in order to ensure that all nodes can be reached from a top node in the order of log (n) traversal steps.

Figures 6A, 6B:
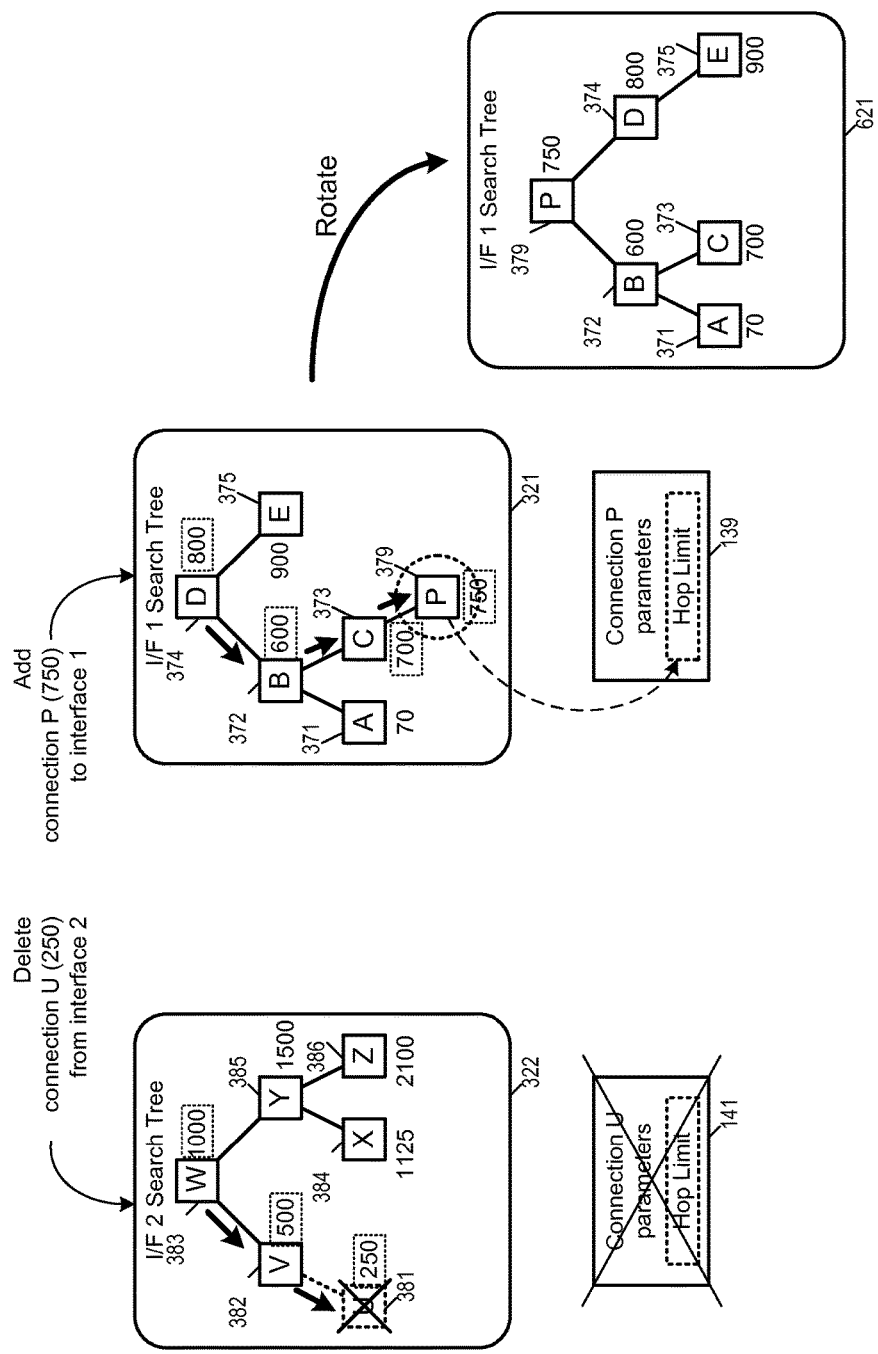
FIG. 6a illustrates the removal of a node from a hop limit search tree when a corresponding connection terminates.
FIG. 6b illustrates the insertion of a node into a hop limit search tree when the communications device establishes a new connection over an interface.

FIG. 6a illustrates the removal of a node from a hop limit search tree when a corresponding connection terminates. As illustrated, the communication device has terminated the connection U that was established over the interface 122 (interface 2). The search tree 322 of the interface 302 in turn receives a command to delete a node associated with the connection "U". The connection "U" maps to index 250, while nodes 381-386 maps to indices 250, 500, 1000, 1125, 1500, and 2100, respectively. The index of the connection "U" allows the search tree management to traverse the search tree from the top node (i.e., the node 383) to the node 381. (The index 250 is less than index 1000 of the node 383 and less than index 500 of the node 382.) Once the node for connection "U" is located, the search tree management deletes the node from the search tree 302.

FIG. 6b illustrates the insertion of a node into a hop limit search tree when the communications device establishes a connection over an interface. As illustrated, the communications device has established a new connection "P" over the interface 111 (interface 1). The newly established connection has a corresponding connection data structure 139, which caches a copy of the hop limit of the interface 111.

The search tree 321 receives a command to add a new node to the search tree 321 of the interface 301 for the connection "P". The connection "P" maps to index 750, while nodes 371-375 of the search tree 321 maps to indices 70, 600, 700, 800, and 900, respectively. Thus, to insert a new node 379 corresponding to the connection "P", the search tree management would have to add the new node 379 as the right child node of the node 373. (The index 750 is less than index 700 of the node 374, more than the index 600 of the node 372, and more than the index 700 of the node 373.) The newly added node 379 includes a pointer that points to the location in the data structure 139 that contains the cached hop limit.

In order to ensure that a search tree remain capable of producing a search result in log (n) time, some embodiments optimizes the search tree by performing balancing or rotation operation to search trees after insertion or deletion of nodes. Node insertion or deletion may cause an AVL tree to become unbalanced, and an unbalanced tree may not be able to produce search result in log (n) time. In FIG. 6b, the search tree 321 became unbalanced after the insertion of the node 379, and the worst cast search requires 4 traversals (from the node 374 to the node 379). Some embodiments therefore balance the search tree 321 by performing an AVL rotation operation to create a rotated search tree 621. In the optimized tree 621, the node 379 (for connection "P") becomes the root/top node of the search tree 621, and all nodes can be reached in 3 traversals or less. The optimized search tree 621 is now the search tree for the interface 111 (interface 1).

For some embodiments, FIG. 7a conceptually illustrates a process 701 for adding a node to a hop limit search tree. In some embodiments, a communications device performs the process 701 when establishing a new connection as described by reference to FIG. 6b above. The process 701 starts when it receives (at 710) a command to add a new connection. The process identifies (at 715) the interface and the corresponding search tree to be used for the new connection. The process 701 then caches (at 720) a copy of the hop limit of the interface in the connection data structure of the newly added connection.

Next, the process maps (at 725) the identifier of the newly added connection to a look up index by e.g., hashing the 5-tuple parameters of a TCP connection. The process then uses (at 730) the look up index to insert a new node into the corresponding search tree. The process also links the newly added node (i.e., insert a pointer at the newly added node) to the storage location for the cached hop limit in the newly added connection's parameters data structure.

After adding the new node for the new connection, the process performs (at 735) maintenance operations on the search tree in order to ensure that any subsequent search for any node in the tree can be done in less than log (n) steps. In some embodiments, this requires rotating the AVL structure of binary search tree. After performing the tree maintenance operations, the process 701 ends.

FIG. 7b conceptually illustrates a process 702 for removing a connection from a hop limit search tree. In some embodiments, a communications device performs the process 702 when terminating a connection as described by reference to FIG. 6a above.

The process 702 starts when it receives (at 750) a command to terminate a connection. The process identifies (at 755) the interface and the search tree that was used for the terminated connection. As mentioned, in some embodiments, each interface has a dedicated search tree for looking up the hop limit values of the connections established over the interface. The process then maps (at 760) the identifier of the terminated connection to a look up index by e.g., hashing the 5-tuple parameters of a TCP connection. Next, the process uses (at 765) the look up index to identify the node in the search tree that corresponds to the terminated connection. The process then deletes (at 770) the identified node.

After deleting the node of the terminated connection, the process performs (at 775) maintenance operations on the search tree in order to ensure that any subsequent search for any node in the tree can be done in less than log (n) steps. In some embodiments, this operation includes linking nodes that are separated by the deleted node and rotating the AVL structure of binary search tree. After performing the tree maintenance operations, the process 702 ends.

In addition to adding nodes to and removing nodes from a search tree, some embodiments also allows the hop limit values pointed to by (or stored in) search tree nodes to be updated or modified. Particularly, in some embodiments, a communications device may receive a router advertisement message that requests an update of the hop limit value of an interface. Upon receiving such a command, some embodiments use the search tree of the interface to update the copies of the hop limit values that are cached in the connection data structures. Specifically, the search tree is used to ensure that all cached copies of the hop limit values for all connections established over the interface are up to date.

Figure 8B:
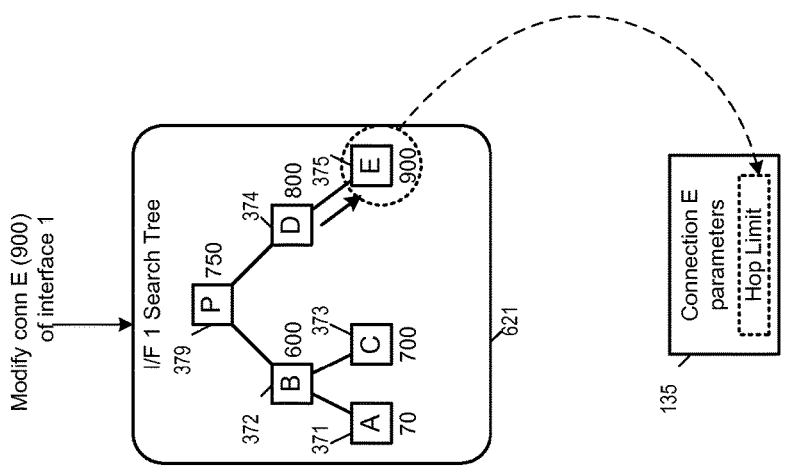
FIG. 8b illustrates an operation that modifies the hop limit value of a particular connection.
Figure 8A:
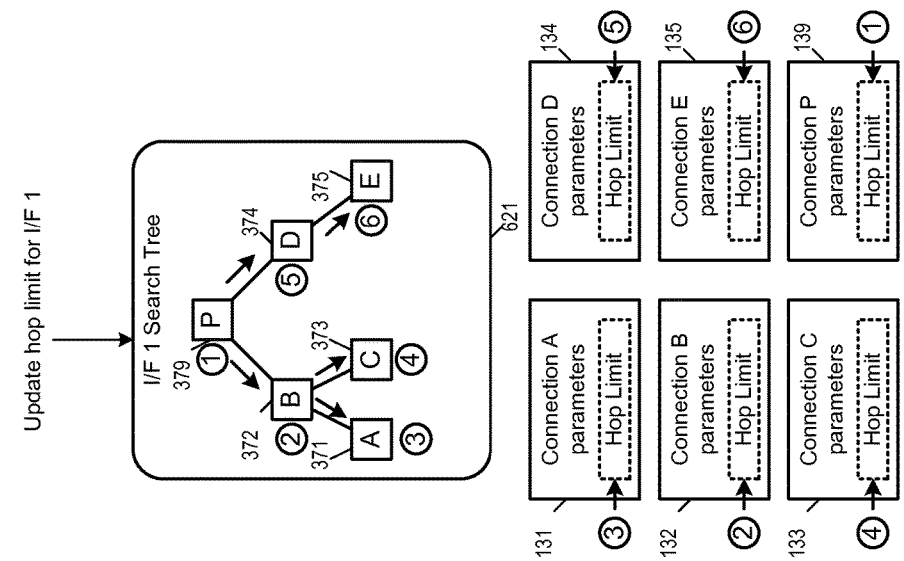
FIG. 8a illustrates the updating of hop limit value of all connections established over an interface by using a search tree of the interface.

FIG. 8a illustrates the updating of hop limit value of all connections established over the interface 301 by using the search tree 621 of the interface 301. As illustrated, upon receiving the update interface command, the communications device uses the search tree 621 to traverse every node and update the hop limit value of every connection. In this example, this traversal and update is in the order of the nodes 379, 372, 371, 373, 374, and 375. As each node is traversed, its stored pointer is used to locate the cached copy of the hop limit in the corresponding data structure so the communications device can modify the cached copy to the newly specified hop limit value.

Figure 9:
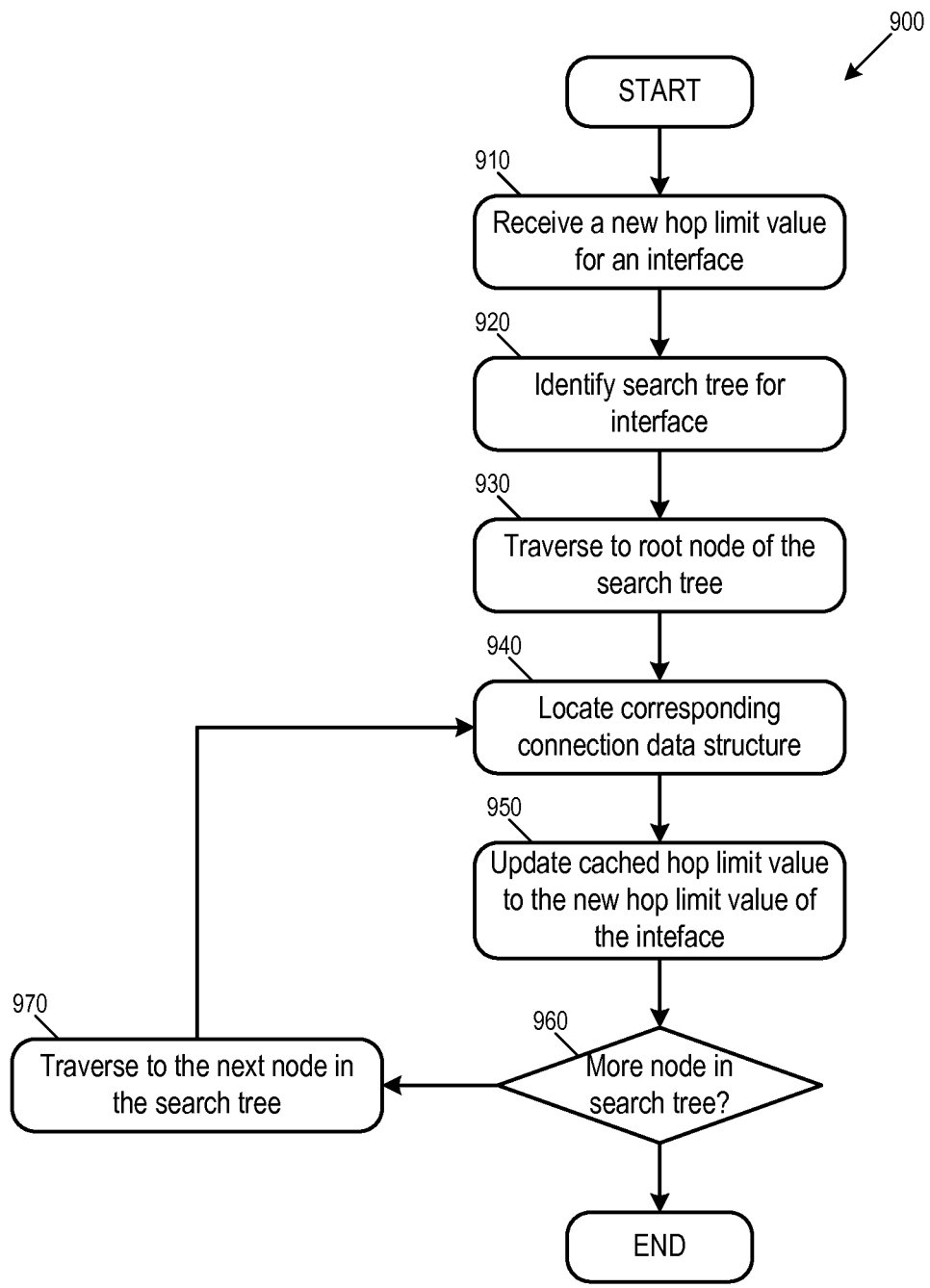
FIG. 9 conceptually illustrates a process for updating the cached copies of the hop limit value of a communications interface.

FIG. 9 conceptually illustrates a process 900 for updating the cached copies of the hop limit value of a communications interface. The process 900 starts when it receives (at 910) a new hop limit value for an interface. As mentioned, such a new hop limit value is received when the communications device receives a router advertisement message that requests an update of the hop limit value of an interface, or when a system administrator sets the hop limit value of an interface. The process 900 then identifies (at 920) the hop limit search tree for the interface.

Next, the process traverses (at 930) to the root node of the search tree. The process then locates (at 940) the corresponding connection data structure that is pointed to by the pointer stored in the traversed node. The process then updates (at 1750) the copy of the hop limit value cached in the connection data structure to that of the newly received hop limit value for the interface. The process then determines (at 960) if there more nodes in the search tree that has yet to be traversed. If so, the process proceeds to 970 to traverse to the next node in the search tree. If not, the process 900 ends.

At 970, the process traverses to the next node in the search tree. In some embodiments, such traversal follows any of the well-known binary tree traversal conventions, such as breadth-first search or depth-first search. The process then returns to 940 to locate the next corresponding connection data structure.

In some embodiments, a hop limit value is always specified for an interface so all updates to hop limit values necessarily requires updates to all connections established over the interface. However, in some other embodiments, hop limit values can be specified for each individual connection. FIG. 8b illustrates an operation that modifies the hop limit value of a particular connection. As illustrated, the search tree 621 has received a command to update the hop limit value of connection "E". The connection "E" is a connection established over interface 1 (interface 111), and hence the search tree 321 has a node associated with the connection E. The identifier of connection E (e.g., its 5-tuple) maps to an index 900, and the search tree 621 uses this index value to traverse from the root node 379 to the node 375. (The index 900 is more than index 750 of the node 379, and more than the index 800 of the node 374). The pointer stored in the node 375 is in turn used to locate the actual storage location of the hop limit of connection E, allowing its content to be updated or modified.

III. Architecture

Figure 10:
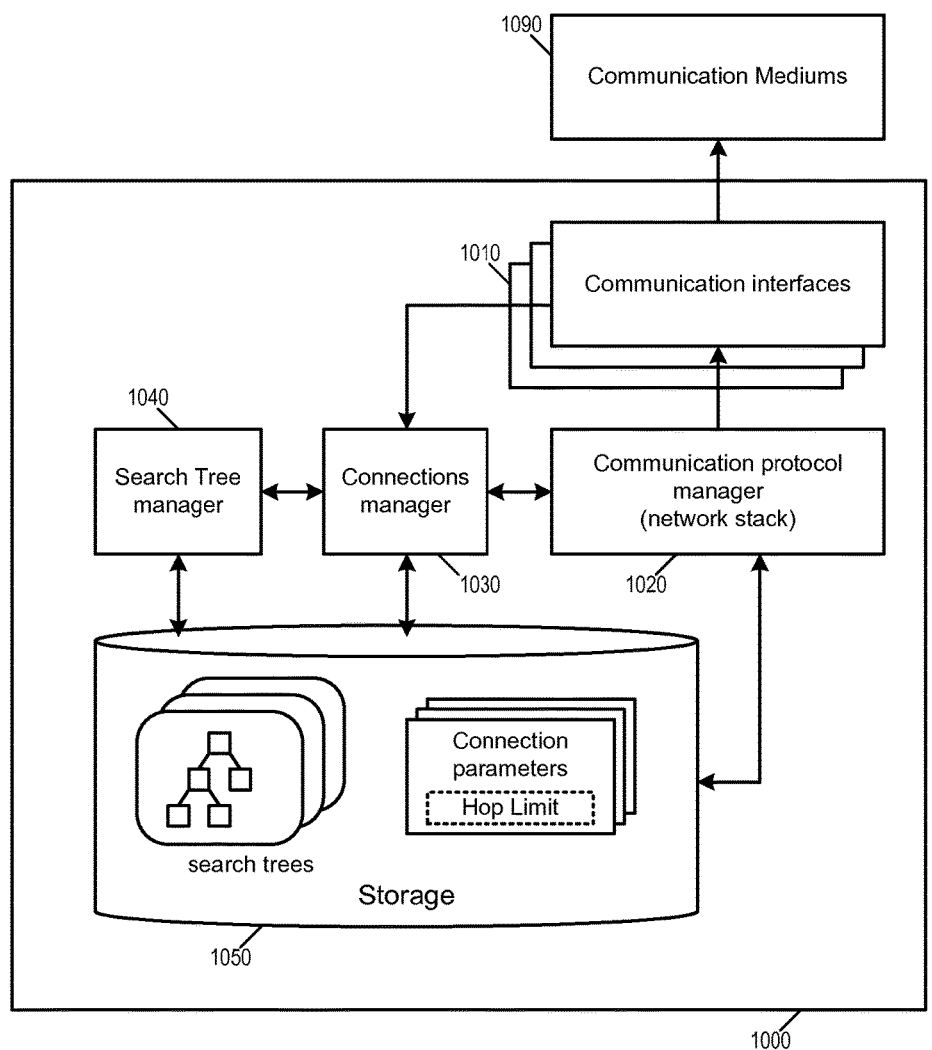
FIG. 10 illustrates the architecture of an example communications device 1000 for some embodiments of the invention.

As mentioned earlier, some embodiments of the invention are implemented by a communications device that is communicatively linked with other communications device across one or multiple types of communications mediums. For some embodiments, FIG. 10 illustrates the architecture of an example communications device 1000 for some embodiments of the invention.

As illustrated, the communications device 1000 is communicatively linked with other communications devices across communications medium 1090. The communications device 1000 includes communications interfaces 1010, a communications protocol manager 1020, a connection manager 1030, a search tree manager 1040, and a storage 1050.

The communications interfaces 1010 includes interfaces for different communication mediums. In some embodiments, each interface is a different PHY for different type of medium. For example, some embodiments have an interface for 10 Gigabit Ethernet (i.e., a 10 Gigabit PHY) and another interface for Gigabit Ethernet (i.e., a 10 Gigabit PHY). In some embodiments, a PHY is compatible with multiple different communication standards and thus able to serve as multiple different communication interfaces. When a communications interface in 1010 receives a request to updated its hop limit, it relays the new hop limit value of the interface to the connection manager 1030 so the connection manager can cache copies of the new hop limit value along with connection parameters stored in connection data structures.

The communications protocol manager 1020 assembles packets and ensuring that protocols at different layers of network communications stack are complied with. To assemble the header of a packet of a particular TCP connection, the communications protocol manager 1020 fetches a corresponding connection data structure from the storage 1050, which also include a cached hop limit value. The cached hop limit value is inserted into the header of the assembled packet. When a particular connection is established or a terminated, the communications protocol manager relays the identity of the particular connection to the connection look up module 1030 so a corresponding node in the search trees can be added or deleted.

The connections manager 1030 is responsible for creating copies of hop limit values and inserting them into corresponding connection data structures. When a new hop limit value is specified for an interface, the connections manager 1030 uses the search tree manager to locate each connection data structure and to insert the updated hop limit value into each located connection data structure. Using a search tree of an interface to update the cached hop limit value is described by reference to FIGS. 8a and 9 above. The connections manager 1030 is also responsible for mapping identifiers for TCP connections (e.g., 5-tuple parameters) into search tree look up indices. Such mapping is described above by reference to FIG. 5. When the communications protocol manger 1020 informs the connections manager 1030 that a particular connection has been newly established or deleted, the connections manager maps the connection's identifier and informs the search tree manager 1040 to add or delete node.

The search tree manager 1040 is for maintaining the search tree structures and for traversing the search trees based on an index provided by the connection manager 1030. It is also responsible for adding, deleting, and modifying nodes in the search trees. Once the search tree manager 1040 has located a node, it supplies the content (e.g., a pointer a cached hop limit value in a connection data structure) of the located node to the connections manager 1030.

The storage 1050 stores the search trees 1061 for different communications interfaces as well as the data structures 1062 for the different connections. The search tree manager 1040 access the storage 1050 for managing the search trees and for retrieving content of the nodes in the search trees. The connections manager access the storage 1050 for inserting copies of the hop limit value into the connection data structures 1062. The communications protocol manager 1020 accesses the storage 1050 for fetching the connection data structures 1062 when assembling packet headers for transmission.

While many of the features have been described as being performed by one module, one of ordinary skill in the art will recognize that the functions described herein might be split up into multiple modules. Similarly, functions described as being performed by multiple different modules might be performed by a single module in some embodiments. For example, the functions of the connections manager 1030 and the search tree manager 1040 can be performed by one software module. Such a software module in some embodiments performs the processes 701, 702, and 900 described above by reference to FIGS. 7 and 9.

Furthermore, though above sections describe a method for fast look up and update for the current hop limit parameter in the IP header of a data packet, the same method can apply to any parameter or values in a data packet that needs frequent look up and update. For example, the method described in Section I can be used to cache the copies of a parameter X in order to facilitate the fast look up of the parameter X, while the method described in Section II can be used to manage the update of the cached copies of the parameter X.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

Figure 11:
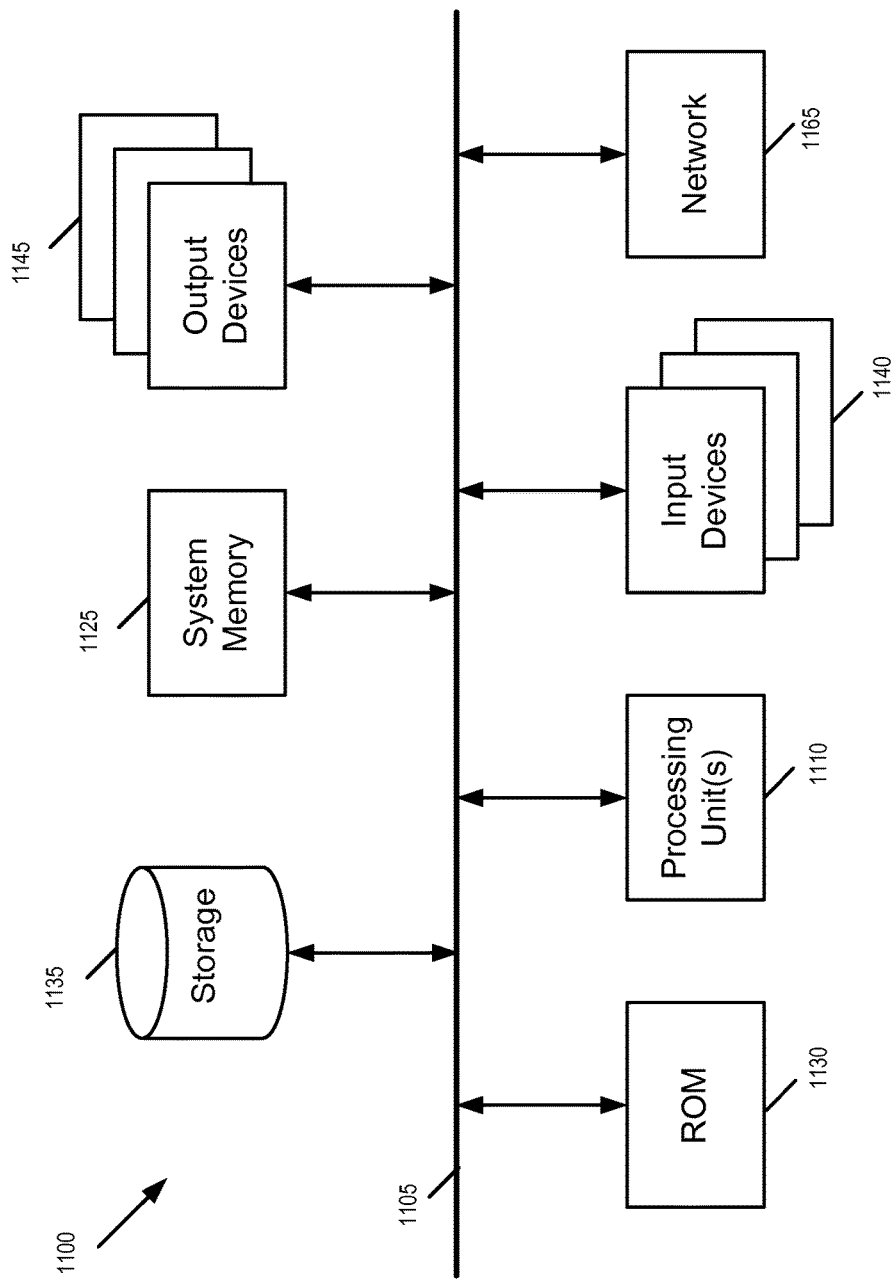
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 7 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for transmitting packets from a communications device, the method comprising:
   traversing a search tree to locate a node that corresponds to a particular transmission control protocol (TCP) connection, wherein the search tree comprises a plurality of nodes, each node pointing to a data structure of a corresponding TCP connection from a plurality of TCP connections;
   receiving data for transmission on a first TCP connection from the plurality of TCP connections;
   based on the received data, accessing connection parameters of the first TCP connection, the connection parameters comprising a hop limit value that is cached in a first data structure for the TCP connection;
   assembling a packet header based on the connection parameters; and
   transmitting a data packet over the first TCP connection, the data packet comprising the packet header and the received data.

2. The method of claim 1, wherein assembling the packet header based on the connection parameters comprises inserting the hop limit value into the packet header.

3. The method of claim 1, wherein the first data structure comprises the connection parameters of the first TCP connection, and wherein accessing the connection parameters comprises accessing the first data structure.

4. The method of claim 1, wherein the nodes of the search tree correspond to TCP connections that are established over a particular communications interface.

5. The method of claim 1 further comprising maintaining a plurality of search trees that each correspond to a different communications interface, each search tree used for updating copies of hop limit values cached in data structures of TCP connections that are established over the corresponding communications interface.

6. The method of claim 1, wherein the hop limit value limits a number of hops the transmitted data packet can have before reaching its destination.

7. The method of claim 6, wherein the data packet comprises an IPv6 (Internet Protocol version 6) header, and wherein the hop limit value is inserted into the IPv6 header.

8. The method of claim 1, wherein the data structure is identified by an index derived from a set of identifying information of the first TCP connection, each data structure for the TCP connection embedding a copy of the hop limit value, wherein the search tree is used to locate a node that corresponds to the first TCP connection based on the index, and the set of identifying information is a five-tuple identifier of the particular connection.

9. The method of claim 1, wherein the search tree is an Adelson-Velskii and Landis (AVL) binary search tree.

10. A communications device comprising:
    a set of processors; and
    a transmitter for assembling packets for transmission for a transmission control protocol (TCP) connection, the assembling of a packet for the TCP connection comprising:
       receiving data for transmission on the TCP connection;
       based on the received data, accessing connection parameters of the TCP connection, the parameters comprising a hop limit value that is cached in a data structure for the TCP connection;
       assembling a packet header based on the accessed connection parameters; and
       transmitting a data packet over the TCP connection, the data packet comprising the packet header and the received data.

11. The communications device of claim 10, wherein the data structure is identified by an index derived from a set of identifying information of the TCP connection, each data structure for the TCP connection embedding a copy of the hop limit value.

12. The communications device of claim 10, further comprising a hop limit update controller for:
    receiving an updated hop limit value; and
    updating the copy of the hop limit value embedded in the data structure of the TCP connection with the updated hot limit value.

13. The communications device of claim 12, wherein the hop limit update controller uses search trees to locate the copy of the current hop limit value.

14. The communications device of claim 13, further comprising a plurality of communications interfaces, each search tree corresponding to a different communications interface.

15. The communications device of claim 14, wherein each node of a search tree of a particular communications interface corresponds to a particular TCP connection that is established over the particular communications interface.

16. The communications device of claim 14, wherein each search tree is an Adelson-Velskii and Landis (AVL) binary search tree.

17. One or more computer-readable storage media comprising computer-executable instructions for assembling packets for transmission for a transmission control protocol (TCP) connection, that when executed by one or more processors, cause the one or more processors to:
    receive data for transmission on the TCP connection;
    based on the received data, access connection parameters of the TCP connection, the parameters comprising a hop limit value that is cached in a data structure for the TCP connection;
    assemble a packet header based on the accessed connection parameters; and
    transmit a data packet over the TCP connection, the data packet comprising the packet header and the received data.

18. The one or more computer-readable storage media claim 17, wherein assembling the packet header based on the accessed connection parameters comprises inserting the hop limit value into the packet header.

19. The one or more computer-readable storage media claim 17, wherein the data structure comprises the connection parameters of the TCP connection, and wherein accessing the connection parameters comprises accessing the data structure.

20. The one or more computer-readable storage media claim 17, wherein the data structure is identified by an index derived from a set of identifying information of the TCP connection, each data structure for the TCP connection embedding a copy of the hop limit value.

* * * * *